(12) United States Patent
Bracker et al.

(10) Patent No.: US 9,857,820 B2
(45) Date of Patent: Jan. 2, 2018

(54) METHOD AND DEVICE FOR SIMULATING AN ELECTRIC/ELECTRONIC LOAD

(71) Applicant: DSPACE DIGITAL SIGNAL PROCESSING AND CONTROL ENGINEERING GMBH, Paderborn (DE)

(72) Inventors: Joerg Bracker, Delbrueck (DE); Marc Dolle, Paderborn (DE)

(73) Assignee: DSPACE DIGITAL SIGNAL PROCESSING AND CONTROL ENGINEERING GMBH, Paderborn (DE)

( * ) Notice: Subject to any disclaimer, the term of this patent is extended or adjusted under 35 U.S.C. 154(b) by 906 days.

(21) Appl. No.: 14/249,411

(22) Filed: Apr. 10, 2014

(65) Prior Publication Data

US 2014/0222240 A1    Aug. 7, 2014

Related U.S. Application Data

(62) Division of application No. 12/089,470, filed as application No. PCT/EP2006/009703 on Oct. 6, 2006, now Pat. No. 8,768,675.

(30) Foreign Application Priority Data

Oct. 7, 2005 (DE) .................. 10 2005 048 464

(51) Int. Cl.
*G06F 17/50* (2006.01)
*G05F 1/625* (2006.01)
*G05B 17/02* (2006.01)

(52) U.S. Cl.
CPC ............. *G05F 1/625* (2013.01); *G05B 17/02* (2013.01)

(58) Field of Classification Search
CPC ....................................................... G05F 1/625
(Continued)

(56) References Cited

U.S. PATENT DOCUMENTS

| 4,517,839 A | 5/1985 | Van Dyke |
| 4,751,443 A | 6/1988 | Jackson et al. |

(Continued)

FOREIGN PATENT DOCUMENTS

| DE | 10205795 A1 | 8/2003 |
| DE | 10303489 A1 | 8/2004 |

(Continued)

OTHER PUBLICATIONS

By Ramaswamy et al.; A Case Study in Hardware-In-the-Loop Testing: Development of an ECU for a Hybrid Electric Vehicle; SAE Technical Paper Series 2004-1-0303; Mar. 2004; 12 pages.*

(Continued)

*Primary Examiner* — Hugh Jones
(74) *Attorney, Agent, or Firm* — Leydig, Voit & Mayer, Ltd.

(57) ABSTRACT

A device connectable to a control device for simulating an effect of at least one electrical or electronic load being connected to at least one terminal of the control device includes: a processing unit configured to at least one of compute and make available a control variable corresponding to the effect of the at least one electrical or electronic load that is to be simulated, and a power supply device: The power supply device includes at least one auxiliary voltage source configured to form at least one of a current source and a current sink and configured to receive the control variable from the processing unit. The at least one auxiliary source is configured to draw a current from the control device or impress a current on the control device based on the received control variable.

18 Claims, 4 Drawing Sheets

(58) Field of Classification Search
USPC .......................................................... 703/13
See application file for complete search history.

(56) References Cited

U.S. PATENT DOCUMENTS

| 5,038,247 A | 8/1991 | Kelley et al. |
| 5,214,582 A | 5/1993 | Gray |

FOREIGN PATENT DOCUMENTS

| JP | 2294710 A | 12/1990 |
| JP | 2000069765 A | 3/2000 |
| JP | 2003153547 A | 5/2003 |
| JP | 2003305571 A | 10/2003 |
| JP | 2005045981 A | 2/2005 |
| WO | WO 9214216 A1 | 8/1992 |
| WO | WO 0237399 A | 5/2002 |

OTHER PUBLICATIONS

Isermann et al.; Design of computer controlled combustion engines; Mechatronics 13 (Dec. 2003) 1067-1089.
Ramaswamy et al.; A Case Study in Hardware-In-the-Loop Testing: Development of an ECU for a hybrid Electric Vehicle; SAE Technical Paper Series 2004-01-0303; Mar. 2004; 12 pages.
Malinkowski, M.; Jasinski, M M.; Kazmierkowski, M.P.;, "Simple direct power control of three-phase PWM rectifier using space-vector modulation (DPC-SVM)," Industrial Electronics, IEEE Transactions on, vol. 51,No. 2, pp. 447-454, Apr. 2004.
Keybus et al.; DSP and FPGA based platform for rapid prototyping of power electronic converters and its application to a sampled-data three-phase dual-band hysteresis current controller; 0-7803-7262-x102/$10.000 2002 IEEE; pp. 1722-1727.
Laakkonen et al., Electric drive emulator using dSPACE real time platform for VHDL verification; The $47^{th}$ IEEE International Midwest Symposium on Circuits and Systems; Jul. 25, 2004; pp. 279-284.
Lamberg et al. (dSpace); Using HIL simulation to test mechatronic components in automotive engineering; $2^{nd}$ Mechatronic congress on "Mechatronik im automobile", Munich; Nov. 2000; pp. 1-16.
H.Hanselmann, "Real-Time Simulation Replaces Test Drives", Text and Measurement World, Reed Business Information, Highlands Ranch, CO, US, vol. 16, No. 3, Feb. 15, 1996, pp. 35-36, 38 and 40, XP000559454.
Hammerer, Horst, "Simplifying System Validation with Virtual Components", SET GmbH, Aerospace Testing Expo 2004, Apr. 1, 2004, www.smart-e-tech.de, Wangen, Germany, 46 pages.
Chang, Meng-Yueh, "Design and Implementation of a Real-Time Lossless Dynamic Electronic Load Simulator", Power Electronics & Motion Control Lab, Department of Control Engineering, National Chiao Tung University, Taiwan, R.O.C, IEEE, 1997, pp. 734-739.
Office Action dated Apr. 27, 2010 from corresponding Chinese Application No. 200680036597.9, 8 pages.
Slater et al., Real-time emulation for power equipment development Part 2: The virtual machine, IEE proceedings, Electric power application, vol. 145, No. 3, May 1998, pp. 153-158.

\* cited by examiner

METHOD AND DEVICE FOR SIMULATING AN ELECTRIC/ELECTRONIC LOAD

CROSS-REFERENCE TO RELATED APPLICATIONS

This application is a division of U.S. application Ser. No. 12/089,470, filed Apr. 7, 2008, which is a national phase of international application PCT/EP2006/009703, filed on Oct. 6, 2006, which claims priority to German Patent Application No. 10 2005 048 464.6, filed Oct. 7, 2005, all of which applications are hereby incorporated by reference herein in their entireties.

FIELD

The present invention relates to a method and a device for simulating the effect of at least one electrical/electronic, in particular inductive load on a computer control unit, in particular on a motor vehicle control unit. An electrical/electronic load is understood in this case to be a device or a component, which, when connected to a control unit, would induce a current flow out of or into the same, depending on the physical properties of the load.

BACKGROUND

The motor vehicle sector is one field of application where control units are used to control various tasks in a vehicle, such as fuel injection, throttle valve movement, control of servomotors (for example, wipers, air-conditioning flap valves, etc.). The reference to this field within the framework of the description of the present invention in no way limits the present invention thereto, but is merely intended for exemplary purposes.

To be able to effectively operate modern vehicles, various vehicle tasks are realized by a number of control units having suitable sensor inputs, control algorithms and actuator outputs. A plurality of steps are entailed in developing these types of control units for the automotive sector.

When defining a control engineering task, it is first necessary to mathematically model and simulate a technical-physical process upon which a desired dynamic behavior is to be impressed. On the basis of the resulting abstract mathematical model, various control concepts, which are likewise provided exclusively as a mathematical model conception, are able to be tested in the framework of numerical simulations; this step constitutes the modeling and controller design phase, for the most part on the basis of computer-based modeling tools.

In a second step, the controller designed in the mathematical model is transferred onto a simulation unit capable of real-time processing, which, for the most part, by far exceeds a typical production control unit, both in its computing capacity, as well as in its I/O capabilities, and which communicates interactively with the real physical process, respectively with a device that determines this process.

Since the transfer of the abstractly formulated controller from a modeling tool onto the simulation unit is largely automated, one speaks in the second phase of rapid control prototyping (RCP) or of function prototyping.

If the control engineering problem is resolved by the controller operated on the simulation unit, the control algorithm is then transferred in the context of the control unit implementation—mostly in a fully automated process—onto the production control unit that is to be ultimately used in practice. This process is described as implementation.

In principle, a pre-engineered control unit is now available, and test runs and test procedures could, therefore, be carried out at this point. Such test runs/procedures are carried out under unfavorable and extreme conditions in order to ensure fault tolerance. Since vehicle prototypes are usually not yet available at the time of this development stage, and to make parallel development possible by shortening development times, test scenarios are carried out on simulators.

This means that the developed real control unit inclusive of the software is tested on the basis of a simulated controlled system, respectively a test environment. This development step is referred to as a hardware-in-the-loop (HIL) process. Another advantage of such an approach is that a single control unit or only parts of the interconnected system of control units or also real components (for example, the motor) is/are also able to be simulated in combination with the control unit. This makes possible virtual test runs, long before the first vehicle prototype is complete. Enormous savings in costs and time are thereby achieved. Such a simulator is also able to perform test runs beyond the limits that real vehicles are capable of. In addition, test runs can be reproduced, automated and modified in terms of the parameters.

The controlled system, respectively a test environment can be simulated both on the software side, as well as by hardware. However, not every behavior can be readily simulated, particularly not that of an electrical or electronic load, so that the real load is then connected to the control unit. The throttle valve or also a wiper motor are mentioned here as examples.

In a simulation, inductive loads pose particular difficulties since, when the voltage supply is switched off, the inductance attempts to maintain the power in the system and thereby induces a current $I_L$ in the opposite direction of the supply current.

From the related art, it is known to simulate electrical/electronic loads using suitable hardware components that are brought onto load or installed. In the process, the real load, thus, in concrete terms, a wiper motor, for example, is connected in order to analyze the various aspects of the behavior. In this case, this hardware has a specific physical property, respectively a consistent physical behavior at the control unit, so that, a change in conditions necessitates connecting different hardware to a control unit.

This has the drawback that it is often necessary to reconfigure or modify the real loads. Accordingly, such systems are not readily scalable. Most notably, it is difficult to realize high current loads at low production costs.

Attempts to simulate the behavior of the electrical/electronic loads using computer-based simulation models are unsuccessful in simulating the dynamic behavior of real loads. To be able to simulate the dynamic behavior of a load to an adequate degree, execution times of less than one microsecond are necessary, such an execution time meaning the unit of time required for a one-time execution of a simulation model. Simulation models that are purely computer-based, such as in the simulation environment "Simulink" of the firm MathWorks, reach execution times of 100 microseconds.

SUMMARY

An aspect of the present invention is to provide a method and a device which will make it possible for an electrical/electronic load to be simulated without having to connect the simulated real load to a control unit. It is also an alternative aspect of the present invention to make possible a simulation that is fast enough to also simulate the rapid dynamic behavior of loads, in particular of inductive loads. Yet another alternative aspect of the present invention to render possible a rapid change in the simulation conditions.

In an embodiment the present invention provides a device connectable to a control device for simulating an effect of at least one electrical or electronic load being connected to at least one terminal of the control device. The device includes: a processing unit configured to at least one of compute and make available a control variable corresponding to the effect of the at least one electrical or electronic load that is to be simulated; and a power supply device including at least one auxiliary voltage source configured to form at least one of a current source and a current sink and configured to receive the control variable from the processing unit. The at least one auxiliary source is configured to draw a current from the control device or impress a current on the control device based on the received control variable.

BRIEF DESCRIPTION OF THE DRAWINGS

Aspects of the present invention will now be described by way of exemplary embodiments with reference to the following drawings, in which.

DETAILED DESCRIPTION

Figure 1:
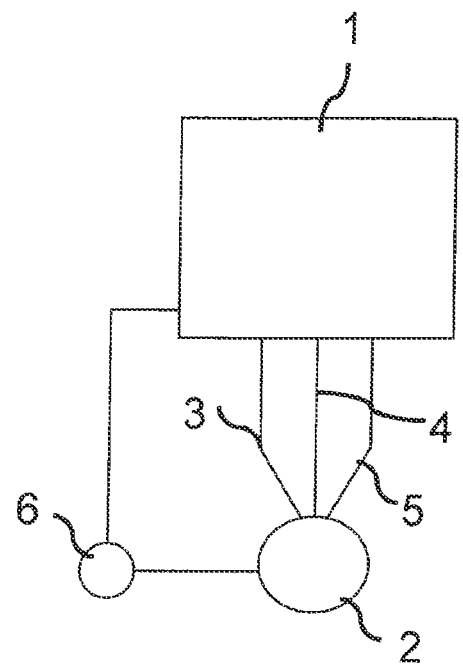
FIG. 1 shows a three-phase direct-current motor which is connected to a control unit according to an exemplary embodiment of the present invention.

An aspect of the present invention includes a method which provides for actually simulating a current that is theoretically flowing through the simulated load at the at least one terminal in that a current is drawn from the control unit or impressed thereon by a controllable power supply unit that is connected to the at least one terminal of a control unit.

This method involves the idea that, instead of connecting the real load to a control unit for test purposes, a power supply unit that virtually, i.e., effectively simulates the current that would flow through the real load, is now connected thereto in that the current that would theoretically flow through the load is now produced by this power supply unit.

The power supply unit makes it possible for a current to be drawn from the control unit, i.e., the current flows from the control unit into the power supply unit, or for it to be impressed upon this control unit, i.e., the current flows from the power supply unit into the control unit. In so doing, the current flows in each case over the one or more terminals of the control unit to which the real load would be connected and to which the power supply unit is connected instead.

In comparison to the terminal of a real load, this procedure is advantageous since the power supply unit may be capable of simulating the physical behavior of not only one, but preferably of a plurality of different real loads, for example by employing a suitable parameterization that may be implemented by software, for example.

This may be achieved by a device which is connectable to a control unit and for which at least one processing unit is provided for effectively simulating the current flowing through the simulated load at at least one terminal of a control unit. The processing unit computes and/or makes available a control variable representing the current in the load, in particular as a function of a total voltage or the value thereof which falls off across the simulated load. For this, at least one power supply unit having at least one auxiliary voltage source is provided for forming a current source and/or a current sink, to which the control variable is transmittable from the processing unit and which draws a real current, which is dependent on the transmitted control variable, from the control unit or impresses it on the same.

An aspect of this device which may be used for implementing the method is that, on the basis of a calculation instruction that is defined in a processing unit, a control variable is formed which is used, in turn, for controlling the aforementioned power supply unit in order to actually and effectively produce a current at the control unit that corresponds to the current that would flow if the simulated load were actually connected to the control unit.

In order for a current whose physical behavior corresponds to the real load to be simulated by the power supply unit at the particular terminal of the control unit, it may be provided for such a terminal to be connected by the power supply unit to at least one auxiliary potential. In this case, the auxiliary potentials may be given by the terminals for the supply voltage and the ground connection of the control unit, for example.

Accordingly, if a terminal of a control unit to which the control unit had applied a control voltage that is derived from the absolute value between the ground connection and the supply voltage, is pulled to ground by the power supply unit, then a current is generated from the control unit. On the other hand, if the terminal is pulled to supply potential, the current then flows into the control unit.

Thus, the direction of current flow may be influenced in this manner. In this context, suitable circuits are used by the device according to the present invention for connecting a terminal to an auxiliary potential.

It may be provided, in particular, for the auxiliary potential to be selectable as a function of the control variable and/or for the magnitude of the auxiliary potential to be settable. Thus, the potential difference at a terminal of the control unit may be influenced as a function of the control variable, both in terms of the polarity, as well as in terms of the absolute value. Thus, currents may be simulated in both directions of flow and in different current intensities.

The mentioned power supply unit is able to set or select a variable current-limiting arrangement as a function of the control variable which preferably represents the theoretical current in the simulated load. On the one hand, the aforementioned auxiliary potential may be used as such a current-limiting arrangement since, in terms of its absolute value, a current is dependent on the potential difference between the auxiliary potential and the terminal of the control unit.

Alternatively or also in addition to this realization, a current-limiting arrangement may also be constituted of a settable resistor element. This current-limiting arrangement may also be constituted of a transistor, for example.

The aforementioned power supply unit may include a source unit and a current sink unit which are activable as a function of the control variable. Thus, depending on the desired direction of current flow, the one or the other of these two units may be activated. In this respect, it may preferably be provided that both the source unit as well as the current sink unit be able to have at least one current-limiting arrangement of the aforementioned type.

The control variable, which is used for controlling the power supply unit and which influences the current that is to be simulated, may be computed in an especially preferred realization using a simulation model that may be implemented in the processing unit of the device, for example. The special variability of the present invention is also derived herefrom since it is possible to determine what real load is to be simulated by the device by changing or selecting the simulation model. Therefore, without entailing costly reconfiguration operations, it is possible to simulate different loads merely by reprogramming the device according to the present invention. For this purpose, the device may provide an appropriate parameterization capability. Thus, depending on the parameterization, the calculation instruction, which is given by the simulation model, may change, thereby directly influencing the calculation of the control variable and the performance of the power supply unit.

To allow the simulated real load and thus the device according to the present invention to react to a control voltage of the control unit, it may preferably be provided in this case for the control variable to be calculated at least as a function of the control voltage of the control unit present at at least one of the terminals of the control unit, on the basis of a control or regulating algorithm which is executed in the control unit. Thus, such a control voltage may preferably form at least one input parameter of the simulation model.

In one realization of the method according to the present invention, respectively of the device according to the present invention, it may be provided for the control variable to be calculated purely on a software basis, for which a program that converts the simulation model into microprocessor steps, is executed in the processor unit. Especially in the case of a highly dynamic behavior of a load, such as of an inductive load, for example, it may be that the computational speed does not suffice for simulating the current as closely to realtime as possible.

Thus, it may be provided in one embodiment for the calculation instructions of the simulation model to be at least partially implemented as hardware, in some instances also completely as hardware. In the case of a partial hardware implementation, another part of the calculation instructions may be implemented as software, thus, for example, in that calculation instructions are executed as a program by a microprocessor in a data processing unit. In this connection, the portion implemented as hardware is preferably parameterizable by the software portion, for example by a data processing unit. For example, calculated input variables or intermediate variables may be calculated by the software portion and transferred to the hardware portion.

In one realization, the aforementioned processing unit may include both the hardware-based, as well as the software-based portions. In this case, the hardware-based portions, in particular, may make up subunits that are parameterizable by the software portion.

In addition, all input, end or intermediate variables employed in the context of the present invention, thus, for example, the aforementioned parameters, as well as the control variable may be given by physical voltages or currents or by the absolute values or values thereof, in particular depending on the implementation of the hardware portion, for example as analog or digital components.

An aspect of this preferred embodiment is that a hardware acceleration of a simulation model is achieved. This means that the underlying modeling task is separated into two parts. One of these is a software model, which computes the slow components, for example, such as the torque-dependent variables. The other is a hardware component, which computes the model parts that require particularly short execution times. In this context, variables such as resistances and inductances are transferable as parameters to the complete model. In one preferred specific embodiment, the values, including both the values having relatively long execution characters, as well as parameters used for calibration, are transferred from the software model to the hardware component.

In one application, the method and device may be used to simulate inductive loads, thus, for example, the behavior of an inductive load, such as an electronically commutated three-phase direct-current motor, may be simulated by hardware.

It is noted at this point that the present invention is not limited to electronically commutated three-phase direct-current motors, but rather includes all types of loads, such as inductances, resistances and electromotors, such as asynchronous motors, for example.

The configuration of a control unit in conjunction with a direct-current motor, as used in the automotive sector, is discussed below with reference to FIG. 1.

Internally, such a (brushless) direct-current motor 2 is composed of three windings. Each winding is externally accessible on one side via lines 3, 4 and 5; the other sides of the windings are internally interconnected to form what is generally known as a star point.

The externally accessible windings are connected to control unit 1, i.e., to the respective terminals provided there for that purpose. Control unit 1 supplies direct-current motor 2 with voltage. To optimally control the direct-current motor, control unit 1 needs the angular position of the rotor in the direct-current motor. To that end, the angular position in this variant is recorded by the control unit with the aid of an angular encoder 6, which includes Hall sensors or incremental encoders, for example. From the angular position, the control unit calculates the appropriate pulse-width-modulated voltages with whose assistance the direct-current motor is supplied with voltage via terminals 3, 4 and 5 in such a way that the direct-current motor is operated with optimal torque. This means that each winding of the direct-current motor receives a pulse-width-modulated voltage over lines 3, 4 and 5, as is customary for driving motors.

Figure 2:
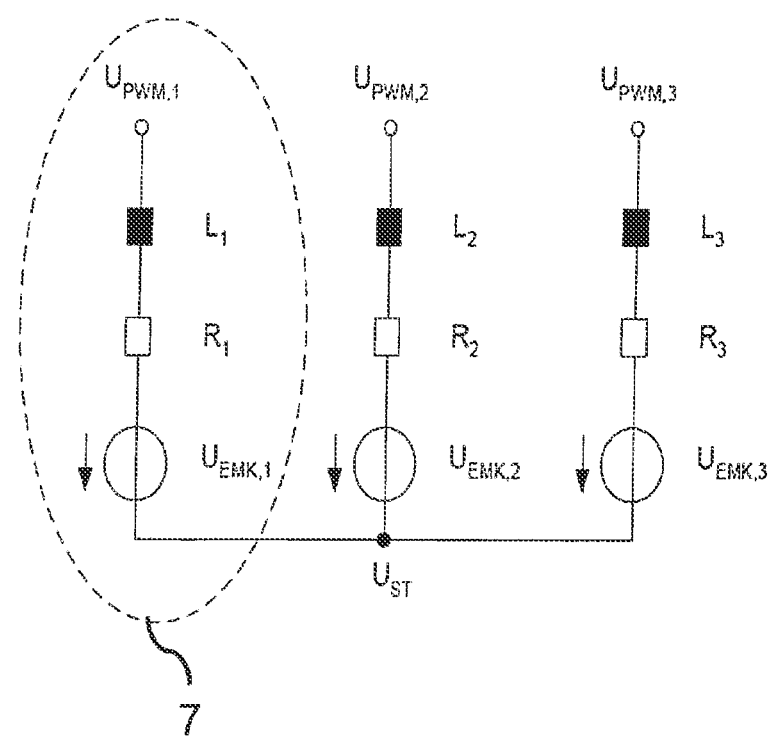
FIG. 2 shows an equivalent electric circuit diagram for the arrangement shown in FIG. 1.

As illustrated in FIG. 2, each of the windings is able to be electrically modeled by an equivalent circuit diagram.

This equivalent circuit diagram is composed of a series connection of external voltage supply $U_{PWM}$ which originates from the control unit at a terminal, winding inductance L, winding resistance R, as well as of a voltage source $U_{EMK}$. Voltage source $U_{EMK}$ simulates the voltage that is induced in the windings by the electromagnetic induction given a rotating motor (electromotive force). To be able to simulate the behavior of the direct-current motor, it is necessary to determine the currents and voltages at the individual components. In the process, it is necessary to consider star voltage $U_{ST}$, which is present at the inaccessible ends of the windings. All of the windings are identical, so that, in the following, only one winding 7 is always considered.

The electrical simulation of a winding is subdivided into two blocks. One is a unit that computes the current flowing through the winding, on the basis of the existing voltages and motor parameters. The other is a unit that includes a current source/current sink which impresses the computed current on the total electric circuit (also in the control unit).

To calculate the winding current, an analog computer is used here in the example. The calculation instruction that the analog computer is required to map is expressed as:

$$I = \int (U_{PWM} - U_{EMK} - U_{ST} - I(t) \cdot R) \cdot \frac{1}{L} dt$$

Figure 3:
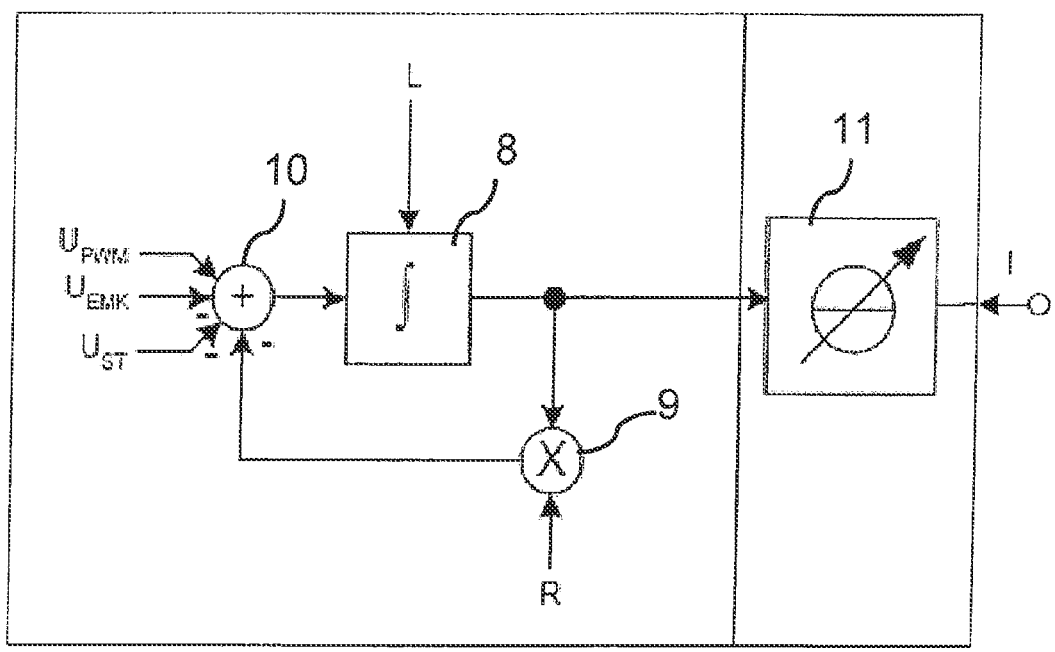
FIG. 3 is a schematic representation of a hardware-based portion of a requisite underlying simulation model according to an exemplary embodiment of the present invention.

The formula is solved by a three-stage hardware circuit, which is illustrated in FIG. 3. The aforementioned processing unit 8, 9, 10 is shown in the left-hand side of the box, and the power supply unit 11 is shown in the right-hand side, a control variable being transferred therebetween. In this context, the processing unit encompasses three stages:

Stage 1: From input voltage $U_{PWM}$ of the control unit that is applied directly to adder 10, adder 10 subtracts countervoltage EMK $U_{EMK}$, star voltage $U_{ST}$, as well as the voltage drop across ohmic winding resistance R.

Voltages $U_{PWM}$, $U_{EMK}$, as well as $U_{ST}$ are applied to adder 10. In the process, the voltage drop across resistance R is computed in another circuit part. $U_{PWM}$ is the actual output voltage applied to the control unit; $U_{EMK}$ as well as $U_{ST}$ are supplied by a microprocessor which receives the values from the software-based portion of the simulation model as calculated values. The software computation suffices for this purpose since these variables change only slowly (in proportion to the speed). The output voltage of this adder corresponds to the voltage that is applied across inductance L, and is transferred to an integrator 8.

Stage 2: Integrator 8 integrates the output voltage of adder 10 with an adjustable integration constant L which describes the inductance of the winding.

Thus, the coil current is calculated using the formula $$I = \int \frac{U}{L} dt.$$

Thus, in the simulation model, the output voltage of integrator 8 represents the coil current and, therefore, the total current. It is, therefore, used as a control variable for the current source/current sink of power supply unit 11 and is transferred to the same.

Stage 3: From the coil current (respectively, the output value of integrator 8) and the externally predefined ohmic resistance value R of the coil, multiplier 9 computes the voltage drop across resistance R in accordance with the formula U=I·R. The calculated voltage drop is subtracted from voltage $U_{PWM}$ at adder 10. In response thereto, the control variable is rapidly fed back as an input voltage into adder 10.

In this context, adder 10 is preferably implemented as an analog operational amplifier circuit. Commercial analog components are preferably used both as integrator 8, as well as as multiplier 9. However, the integrator, in particular, may be implemented using a multiplier. Variables R, $U_{ST}$, $U_{EMK}$ and L are externally supplied to the system illustrated in FIG. 3, preferably via the analog outputs of a microprocessor-controlled circuit board, which may also constitute a component of the aforementioned processing unit. Variable $U_{PWM}$ is fed back to the system through the output of adjustable current source/current sink 11.

Figure 4:
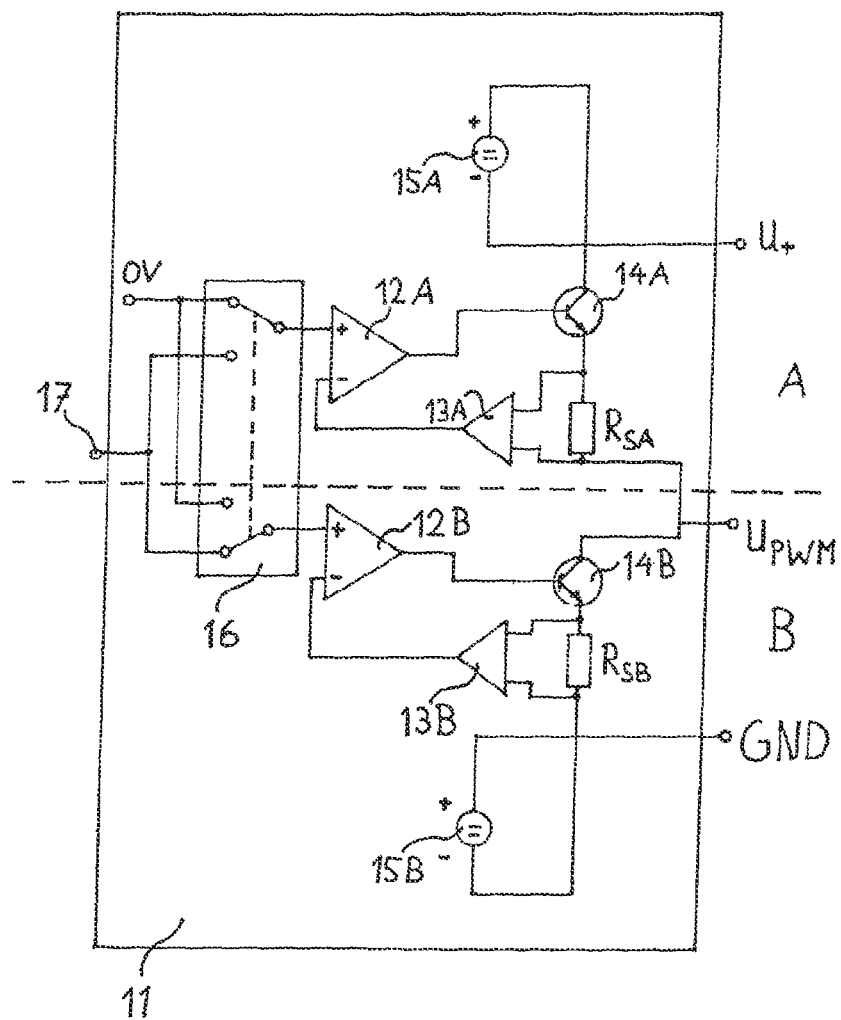
FIG. 4 shows a power supply unit according to an exemplary embodiment of the present invention for generating a current flow at a terminal of a control unit.

Controllable power supply unit 11, including the current source/current sink, is illustrated in detail in FIG. 4. Current source/current sink 11 is capable of realizing two scenarios in this exemplary embodiment. On the one hand, it is used as a current sink. This simulates case B where the inductive load is supplied with current from control unit 1. The other scenario involves case A, where current source/current sink 11 is used as a current source which drives the current into control unit 1. The two scenarios are derived from the fact that, in general, currents occur in both directions at the windings in a three-phase system without feedback to the star point. This is due to the fact that a current that is impressed upon a winding must flow back through at least one other winding to the control unit.

The control variable for adjustable current source/current sink 11 that is present at the output of integrator 8 is applied to input 17 of the current source/current sink. In this context, the applied value is preferably galvanically separated from the output of integrator 8. The lower part of circuit B is active for positive values at input 17, and upper part A is active for negative values.

This is accomplished in that switch 16 connects a circuit part to 0V and the corresponding other circuit part to input 17. Switch 16 is preferably implemented as an operational amplifier-based inverter in that, depending on the polarity of the input voltage, one of the circuit parts always receives a negative input voltage and thereby blocks its output (the respective other circuit part is then active).

The following description assumes that switch 16 is switched in such a way that the lower part of circuit B is connected to input 17. In response thereto, a voltage of 0V is applied to (+) input of the operational amplifier (OPV) 12A. The result is that amplifier 14A operates in the blocking mode, so that no current flows through shunt $R_{SA}$.

In addition, a voltage corresponding to the value at input 17 is applied to the (+) input of operational amplifier 12B. The output of operational amplifier 12B is connected to the control input of the controllable current limiter/resistor 14B. This controllable resistor 14B is preferably implemented as a bipolar transistor or MOSFET. However, other types of controllable resistors may also be used. Likewise conceivable would be an output stage of pulse width modulation-controlled switches in combination with an inductor.

In this context, the pulse width modulation frequency should be much higher than that of the control unit. The inductance should be much smaller than the lowest inductance to be simulated and may also be possibly realized by the lead inductance alone.

The advantage of such an arrangement is that the power delivered by the control unit to the current sink does not need to be released in the current sink itself (for example, in the form of heat at the transistors), but may be supplied to a consumer via lines at another location (for example, resistors external to the current sink).

As a result of the feedback via controllable resistor 14B and operational amplifier 13B, which measures the voltage corresponding to the current from control unit 1, across shunt $R_{SB}$, the value of input 17 is also present at the (−) input of operational amplifier 12B. This means that, as a function of the value at input 17, a current flows through control unit terminal $U_{PWM}$ via auxiliary voltage source 15b to ground connection GND of the control unit.

The current flow for negative values results analogously at input 17. In this context, circuit part A is now active. A current corresponding to input value 17 flows from voltage supply U+ of the control unit with the assistance of auxiliary voltage source 15A into control unit terminal UPWM. Auxiliary voltage sources 15 render possible a suitable current flow also in the case of switched-off output (UPWM) of the control unit. The control unit is necessarily provided with appropriate measures (such as diodes) that permit the flow of current inside of the same, since only in this manner is the principle of a pulse-width modulated power control ensured.

Thus, it is now possible to simulate the behavior of an inductive load and, consequently, to test the control unit performance.

Figure 5:
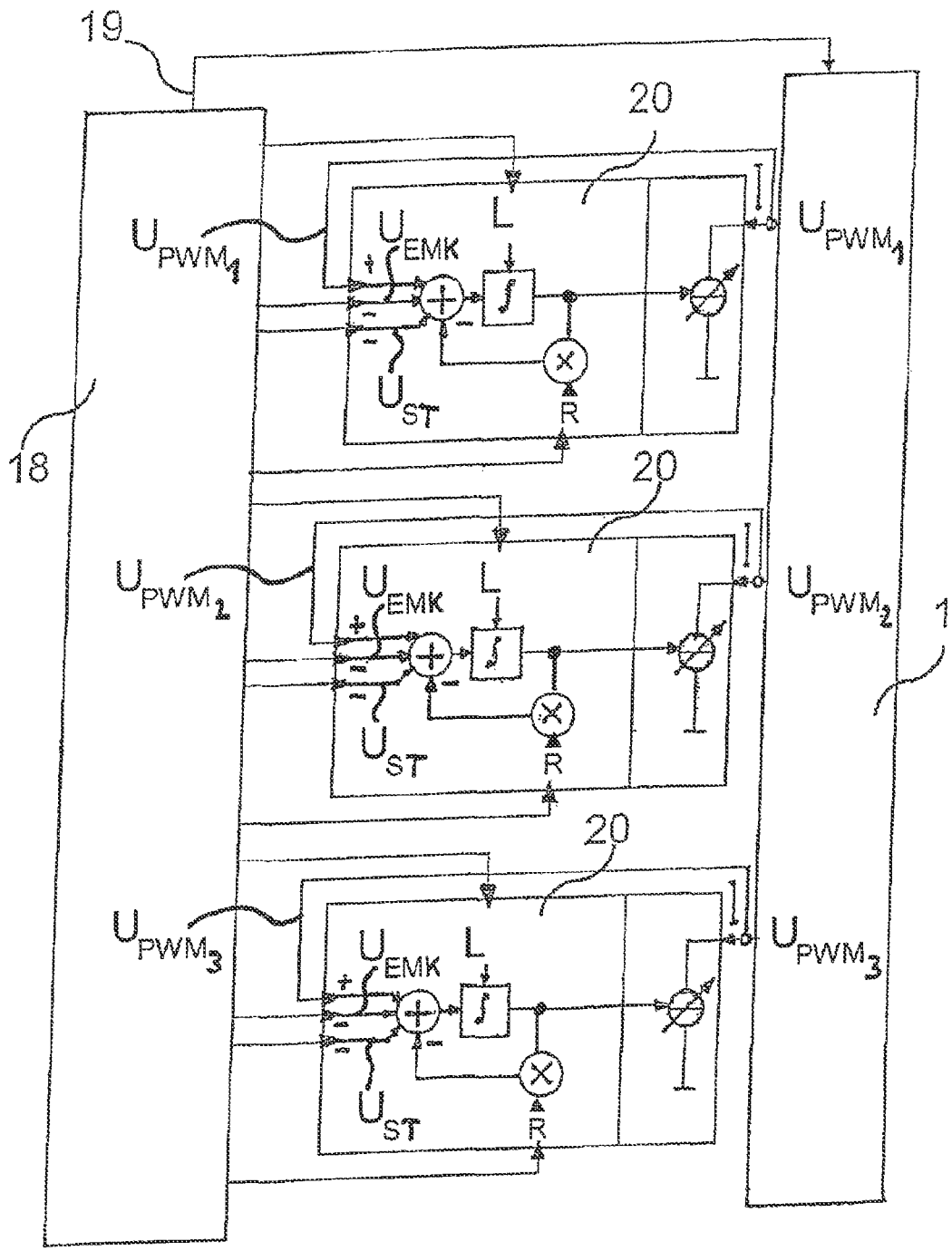
FIG. 5 is a schematic overall view of a device for simulating a three-phase motor having three power supply units which each simulate one of the windings of the motor according to an exemplary embodiment of the present invention.

To simulate an electronically commutated three-phase direct current motor, it is necessary for three simulated windings 20 to be connected to control unit 1. This design is shown in FIG. 5.

Simulated windings 20 are calibrated by the analog outputs of a microcontroller-controlled unit 18. Via connection 19, control unit 1 receives the simulated information from angular encoder 6.

It is thus possible to simulate inductive loads without having to install or remove components. A calibration may be carried out by using a purely software approach for "any given" values for resistances and/or inductances.

Advantages of the present invention include, inter alia:

The hardware simulation makes possible rapid switching times (one microsecond and better). A realistic simulation of current is thereby made possible within one pulse width modulation cycle. A realization is also made possible whereby the actually occurring current is generated in both directions of flow, even given a switched-off output stage in the control unit. The need is also eliminated for reconfiguring or modifying real loads. A good scalability of the various parameters is also provided. Moreover, it is possible to simulate high current loads, as occur, in particular, in drivetrain technologies, such as in the testing of hybrid drives, for example. In comparison with processes involving real loads, lower manufacturing costs may be realized. In addition, the need for costly mechanical test benches power analyzers may be eliminated.

In another advantageous embodiment of the present invention, the described analog hardware design may be implemented by a rapid digital computer (for example, digital signal processors—DSP having suitable analog/digital conversion). FPGAs (filed programmable gate arrays) may also be used.

The invention claimed is:

1. A device connectable to a control device for emulating at least one inductive load being connected to at least one terminal of the control device, the device comprising:
   a processing unit configured to at least one of compute and make available a control variable based on a plurality of inductive load parameters corresponding to the at least one inductive load being emulated; and
   a power supply device including at least one auxiliary voltage source configured to form at least one of a current source and a current sink and configured to receive the control variable from the processing unit, the at least one auxiliary source configured to draw a current from the control device or impress a current on the control device based on the received control variable.

2. The device as recited in claim 1, wherein the control variable represents current that would be drawn from or impressed on the at least one terminal of the control by the at least one inductive load being emulated, and wherein the control variable is based on a function of a total voltage that falls off across the at least one inductive load being emulated.

3. The device as recited in claim 1, wherein the control device is a motor vehicle control unit.

4. The device as recited in claim 1, wherein the current source and the current sink are configured to activate based on an operational sign of the control variable.

5. The device as recited in claim 1, wherein at least one of the current source and the current sink includes at least one controllable current limiting arrangement configured to limit current based on the control variable.

6. The device as recited in claim 5, wherein the current limiting arrangement includes at least one of a settable resistor element and a settable or selectable auxiliary potential.

7. The device as recited in claim 1, wherein the processing unit is configured to compute the control variable by a simulation model that includes calculation instructions that are at least partially implemented in hardware.

8. The device as recited in claim 7, wherein the calculation instructions are at least partially implemented as software that runs on a data processing unit.

9. The device as recited in claim 8, wherein at least one of the processing unit and a subunit of the processing unit is parameterizable by the data processing unit.

10. The device as recited in claim 9, wherein a part of the processing unit implemented in hardware includes an analog integration unit that at least one of computes and makes available the control variable; and wherein the control variable is based a function of a total voltage that would fall off across the at least one inductive load being emulated.

11. The device as recited in claim 10, wherein the part of the processing unit implemented in hardware includes an adder unit that forms the total voltage or an absolute value thereof by adding individual voltages that would act at or in the at least one inductive load being emulated or the absolute values thereof that are supplied to the adder unit, the total voltage or the absolute value thereof being transferable to the integration unit.

12. The device as recited in claim 11, wherein the part of the processing unit implemented in hardware includes a feedback unit configured to feed back the control variable into the adder unit as an individual voltage-or the absolute value of the individual voltage to be added by the adder unit.

13. The device as recited in claim 12, wherein the feedback unit includes a multiplier that is parameterized by an ohmic resistance value and that, as a function of a resistance value from the control variable, is configured to form the individual voltage or the absolute value thereof that is transferable to the adder unit, the resistance value being specifiable by the data processing unit.

14. The device as recited in claim 10, wherein the processing unit includes the data processing unit having a model implemented as the software, the software being configured to compute the individual voltage, or the absolute value thereof, that acts on the load, the individual voltage or absolute value thereof being transferable to at least one of the integration unit and an adder unit of the processing unit.

15. The device as recited in claim 10, wherein a control voltage, or an absolute value thereof, corresponding to a control voltage that would be applied by the control device to the at least one inductive load being emulated, is transferable to an adder unit of the processing unit.

16. The device as recited in claim 7, wherein the parts of the processing unit implemented in hardware include analog modules or digital modules that include at least one of field programmable gate arrays and digital signal processors.

17. The device as recited in claim 5, wherein the at least one controllable current limiting arrangement includes an output stage of a pulse width modulation-controlled switch in combination with an inductor.

18. The device as recited in claim 17, wherein a pulse width modulation frequency of the pulse width modulation-controlled switch is substantially higher than a pulse width modulation frequency of the control-device.

* * * * *